United States Patent Office

3,488,728
Patented Jan. 6, 1970

3,488,728
N-[NITRO-FURFURYLIDENE-METHYL-HETEROCYCLYL]-AMIDINES
Max Wilhelm, Allschwil, and Kurt Eichenberger, Therwil, Switzerland, assignors to Ciba Corporation, New York, N.Y., a corporation of New York
No Drawing. Filed Oct. 8, 1965, Ser. No. 494,238
Claims priority, application Switzerland, Oct. 22, 1964, 13,721/64
Int. Cl. C07d 99/04, 99/10; A61k 27/00
U.S. Cl. 260—240
15 Claims

ABSTRACT OF THE DISCLOSURE

Amidines in which a nitrogen atom is joined to a ring carbon atom of a heterocyclic radical aromatic in character which may be substituted and which contains at least one ring nitrogen atom, which radical is substituted by a 5-nitrofurfurylidene methyl radical in a position that activates a methyl radical, and its salts. The compounds are useful as antiparasitic and antibacterial agents.

---

The present invention relates to new heterocyclic compounds. Especially it concerns amidines in which a nitrogen atom is joined to a ring carbon atom of a heterocyclic radical aromatic in character which may be substituted and which contains at least one ring nitrogen atom, which radical is substituted by a 5-nitrofurfurylidene methyl radical in a position that activates a methyl radical, and its salts.

The heterocylic radical of aromatic character in the new compounds is a mononuclear or polynuclear radical aromatic in character that contains at least one heterocyclic ring aromatic in character containing at least one ring nitrogen atom. Radicals of the kind defined are, for example, radicals that comprise six-membered rings containing a nitrogen atom, for example, pyridine or quinoline radicals, radicals that comprise six-membered and/or five-membered rings containing two nitrogen atoms, for example, diazine radicals such as pyridazine, pyrimidine or pyrazine radicals, and also diazole radicals such as pyrazole, imidazole or benzimidazole radicals, radicals that comprise five-membered and, if necessary, six-membered rings containing a nitrogen atom and an oxygen or a sulfur atom, for example, oxazole, thiazole, benzoxazole or benzthiazole radicals, radicals that comprise five-membered rings containing two nitrogen atoms and an oxygen or a sulfur atom, for example, thiadiazole or oxadiazole radicals, or radicals that comprise five-membered or six-membered rings containing three nitrogen atoms, for example, triazine or triazole radicals.

As substituents attached to carbon atoms of the above-mentioned heterocyclic radicals there may be mentioned, in particular, lower alkyl radicals, for example, methyl, ethyl, propyl or isopropyl radicals, straight-chain or branched butyl, pentyl or hexyl radicals bound in any desired position, lower alkoxy groups, for example, methoxy, ethoxy, propoxy or butoxy groups, halogen atoms, for example, chlorine, bromine or iodine atoms, trifluoromethyl groups or nitro groups.

In heterocyclic radicals containing a hydrogen atom bonded to a ring nitrogen atom, the said hydrogen atom may also be replaced by lower alkyl radicals or acyl radicals, especially benzoyl radicals or above all by lower alkanoyl radicals, for example, acetyl radicals. The 5-nitrofurfurylidene methyl radical is, in particular, in α-position to a ring nitrogen atom or, if necessary, in γ-position to a ring nitrogen atom.

The new compounds may contain further substituents, for example, lower alkyl radicals bound to the methyl radical of the 5-nitrofurfurylidene methyl radical, for example, the lower alkyl radicals indicated above.

The amidine nitrogen atoms may be unsubstituted or substituted. In particular, the N'-nitrogen atom may be monosubstituted or disubstituted, for example, by substituted or unsubstituted aliphatic, cycloaliphatic, cycloaliphatic-aliphatic, araliphatic or aromatic hydrocarbon radicals, for example, by alkyl radicals, for example, those indicated above, alkenyl radicals, for example, lower alkenyl radicals, for example, allyl or methallyl radicals, alkylene radicals, which may also be interrupted by hetero atoms, for example, oxygen, sulfur or nitrogen atoms, for example, lower alkylene radicals interrupted by hetero atoms, for example butylene-(1:4), butylene-(1:5), hexylene-(1:5), hexylene-(1:6), hexylene-(2:5), heptylene-(1:7), heptylene-(2:7), heptylene-(2:6), 3-oxa- or aza-pentylene-(1:5), 3-oxa- or aza-hexylene-(1:6) radicals, cycloalkyl, cycloalkenyl, cycloalkyl-alkyl or cycloalkenyl-alkyl radicals, for example, cyclopentyl, cyclohexyl or cycloalkenyl-alkyl radicals, for example, cyclopentyl, cyclohexyl, cyclopentenyl or cyclohexenyl radicals, cyclopentyl-, cyclohexyl-, cyclopentenyl-, cyclohexenyl-methyl or -ethyl radicals, aralkyl or aryl radicals, for example, phenyl lower alkyl radicals, for example, benzyl or 1- or 2-phenylethyl radicals, or phenyl radicals that may be unsubstituted in the aryl radical or substituted by lower alkyl radicals, lower alkoxy groups, halogen atoms and/or trifluoromethyl groups.

The N' nitrogen atom together with its substituents forms, in particular, a mono- or di-lower alkylamino group, for example, a methylamino, dimethylamino, ethylamino or diethylamino group, a phenyl-lower-alkylamino, (phenyl-lower-alkyl)-amino, phenyl-lower-alkyl-lower-alkylamino or di(phenyl-lower-alkyl)-amino group, for example, a benzylamino, phenylethylamino, benzyl-lower-alkylamino, dibenzylamino or diphenylethylamino group, or a pyrrolidino, piperidino, morpholino, thiamorpholino or piperazino group, for example, the N-methyl-piperazino group.

The amidines are advantageously derived from aliphatic, araliphatic or aromatic carboxylic acids, especially from fatty acids, for example, alkane carboxylic acids, for example, formic acid, acetic acid, propionic acid, butyric acid, valeric acid, aryl or arylalkane carboxylic acids, for example, benzoic acids, or phenyl-lower alkane carboxylic acids, for example, phenyl acetic or phenyl-propionic acids, which may also be substituted as indicated above for the aryl radicals.

The new compounds possess valuable pharmacological properties, especially antiparasitical and antibacterial properties. In particular, they are effective against bacteria in vitro and in vivo. In the infected animal, for example, in the mouse, they are effective against Gram-negative and Gram-positive bacteria, for example, *Salmonella typhi*, for example, *Salmonella typhi murium*, Coli bacilli, for example, *E. coli*, Staphylococci, for example, *Staph. aureus*, and *Pasteurella avicida*. Furthermore, tests carried out on hamsters, for example, have shown that the new compounds are effective against amoeba, and tests carried out on mice and sheep have shown that they are effective against schistosomae. The new compounds are thus useful as antiparasitic and antibacterial agents. In particular they are suitable for treating diseases caused by the pathogens indicated.

The heterocyclic compounds indicated hereinafter deserve special mention. The symbol Nfm in all cases represents the 5-nitro furfurylidene methyl radical of the formula

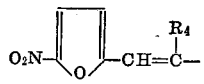

in which $R_4$ represents a lower alkyl radical or especially a hydrogen atom, and A represents a radical of the formula

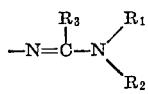

in which $R_1$ and $R_2$ represent hydrogen, phenyl radicals or especially lower alkyl radicals, or $R_1$ and $R_2$ together with the nitrogen atom form a pyrrolidino, piperidino, piperazino, morpholino or thiamorpholino radical, and $R_3$ represents a lower alkyl radical, a phenyl radical or especially a hydrogen atom:

(a) A-4-Nfm-quinolines that may be substituted at ring carbon atoms by lower alkyl radicals, lower alkoxy groups, halogen atoms and/or trifluoromethyl groups, but that are, preferably unsubstituted, especially corresponding 2-A-4-Nfm-quinolines;

(b) A-2-Nfm-quinolines that may be substituted at ring carbon atoms by lower alkyl radicals, lower alkoxy groups, halogen atoms and/or trifluoromethyl groups, but that are preferably unsubstituted, and corresponding 4-A-2-Nfm-quinolines or corresponding 8-A-2-Nfm-quinolines or more especially corresponding 5-A-2-Nfm-quinolines and corresponding 6-A-2-Nfm-quinolines;

(c) A-4-Nfm-pyridines that may be substituted at ring carbon atoms by lower alkyl radicals, lower alkoxy groups, halogen atoms and/or trifluoromethyl groups, but that are preferably unsubstituted, especially corresponding 2-A-4-Nfm-pyridines;

(d) A-2-Nfm-pyridines that may be substituted at ring carbon atoms by lower alkyl radicals, lower alkoxy groups, halogen atoms and/or trifluoromethyl groups, but that are preferably unsubstituted, especially 5-A-2-Nfm-pyridines or corresponding 6-A-2-Nfm-pyridines;

(e) A-3-Nfm-pyridazines that may be substituted at ring carbon atoms by lower alkyl radicals or preferably by lower alkoxy groups or especially by halogen atoms and/or trifluoromethyl groups, but that are preferably unsubstituted, especially 6-A-3-Nfm-pyridazines;

(f) A-4-Nfm-pyridazines that may be substituted at ring carbon atoms by lower alkyl radicals or preferably by lower alkoxy groups or especially by halogen atoms and/or trifluoromethyl groups, but that are preferably unsubstituted, especially corresponding 3-A-4-Nfm-pyridazines or corresponding 6-A-4-Nfm-pyridazines;

(g) A-2-Nfm-pyrimidines that may be substituted at ring carbon atoms by lower alkyl radicals, lower alkoxy groups, halogen atoms and/or trifluoromethyl groups, but that are preferably unsubstituted, especially corresponding 4-A-2-Nfm-pyrimidines;

(h) A-4-Nfm-pyrimidines that may be substituted at ring carbon atoms by lower alkyl radicals, lower alkoxy groups, halogen atoms and/or trifluoromethyl groups, but that are preferably unsubstituted, especially corresponding 2-A-4-Nfm-pyrimidines;

(i) A-2-Nfm-pyrazines that may be substituted at ring carbon atoms by lower alkyl radicals, lower alkoxy groups, halogen atoms and/or trifluoromethyl groups, but that are preferably unsubstituted, especially corresponding 5-A-2-Nfm-pyrazines or corresponding 6-A-2-Nfm-pyrazines;

(k) A-2-Nfm-imidazoles that may be substituted at ring carbon atoms by lower alkyl radicals, lower alkoxy groups, halogen atoms or trifluoromethyl groups, but that are preferably unsubstituted, and that are unsubstituted at ring nitrogen atoms, but that may be substituted at a ring nitrogen atom by a lower alkyl radical, especially corresponding 4-A-2-Nfm-imidazoles;

(l) A-3-Nfm-pyrazoles that may be substituted at ring carbon atoms by lower alkyl radicals, lower alkoxy groups, halogen atoms or trifluoromethyl groups, but that are preferably unsubstituted, and that are unsubstituted at ring nitrogen atoms, but that may be substituted at a ring nitrogen atom by a lower alkyl radical, especially corresponding 5-A-3-Nfm-pyrazoles;

(m) A-2-Nfm-benzimidazoles that may be substituted at ring carbon atoms by lower alkyl radicals, lower alkoxy groups, halogen atoms and/or trifluoromethyl groups, but that are preferably unsubstituted and that are unsubstituted at ring nitrogen atoms, but that may be substituted at a ring nitrogen atom by a lower alkyl radical or a lower alkanoyl or benzoyl radical, especially corresponding 5-A-2-Nfm-benzimidazoles;

(n) A-2-Nfm-oxazoles that may be substituted at ring carbon atoms by lower alkyl radicals, lower alkoxy groups, halogen atoms or trifluoromethyl groups, but that are preferably unsubstituted, especially corresponding 4-A-2-Nfm-oxazoles;

(o) A-2-Nfm-thiazoles that may be substituted at ring carbon atoms by lower alkyl radicals, lower alkoxy groups, halogen atoms or trifluoromethyl groups, but that are preferably unsubstituted, especially 4-A-2-Nfm-thiazoles;

(p) A-2-Nfm-benzoxazoles that may be substituted at ring carbon atoms by lower alkyl radicals, lower alkoxy groups, halogen atoms and/or trifluoromethyl groups, but that are preferably unsubstituted, especially corresponding 5-A-2-Nfm-benzoxazoles;

(q) A-2-Nfm-benzthiazoles that may be substituted at ring carbon atoms by lower alkyl radicals, lower alkoxy groups, halogen atoms and/or trifluoromethyl groups, but that are preferably unsubstituted, especially corresponding 5-A-2-Nfm-benzthiazoles;

(r) 5-A-2-Nfm-1:3:4-oxdiazoles;

(s) 5-A-2-Nfm-1:3:4-thiadiazoles;

(t) A-6-Nfm-1:2:4-triazines that may be substituted at ring carbon atoms by lower alkyl radicals, lower alkoxy groups, halogen atoms or trifluoromethyl groups, but that are preferably unsubstituted, especially corresponding 3-A-6-Nfm-1:2:4-triazines;

(u) A-3-Nfm-1:2:4-triazines that may be substituted at ring carbon atoms by lower alkyl radicals, lower alkoxy groups, halogen atoms or trifluoromethyl groups, but that are preferably unsubstituted, especially corresponding 6-A-3-Nfm-1:2:4-triazines;

(v) 4-A-2-Nfm-1:3:5-triazines that may be substituted at ring carbon atoms by lower alkyl radicals, lower alkoxy groups, halogen atoms or trifluoromethyl groups, but that are preferably unsubstituted;

(w) 5-A-3-Nfm-1:2:4-triazoles.

The 6-A-2-Nfm-quinolines are especially valuable, for example, N-[2-(5-nitrofurfurylidene-methyl)-6-quinolyl]-N':N'-dimethyl-formamidine, and especially the 6-A-3-Nfm-pyridazines and, in particular, N-[3-(5-nitrofurfurylidene-methyl)-6-pyridazinyl]-N':N'-dimethylformamidine.

The new compounds are prepared by methods in themselves known.

Advantageously, the procedure is to react a heterocyclic compound aromatic in character that may be substituted and that contains at least one ring nitrogen atom and a 5-nitrofurfurylidene-methyl radical in a position capable of activating a methyl radical and, at another ring carbon atom, an amino group containing at least one hydrogen atom, such as a free amino group, with an enolether (imino ether), an enolester (iminoester) or an acetal of a carboxylic acid amide or a salt thereof.

Particularly suitable enol ethers are those of lower alkanols, such as methanol or ethanol. Particularly suitable enolesters are those of chloroformic or p-toluenesulfonic acid or imide chlorides or amide chlorides. As acetals there may be used more particularly those in which the alcohol component is a lower alkanol or alkanediol, for example dimethylformamide dimethylacetal.

The reaction is carried out in the usual manner.

The end products are obtained in the free form or in the form of their salts, depending on the conditions under which the process is carried out and on the starting materials used; the salts are also included in the invention. For example, basic, neutral, acid or mixed salts and, if necessary, hemi-, mono-, sesqui- or poly-hydrates thereof can be obtained. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, sulfuric acids, phosphoric acids, nitric acid, perchloric acid; aliphatic, alicyclic, aromatic or heterocyclic carboxylic or sulfonic acids, for example, formic acid, acetic acid, propionic acid, succinic acid, glycollic acid, lactic acid, malic acid, tartaric acid, citric acid, ascorbic acid, maleic acid, hydroxymaleic acid and pyrocemic acid; phenylacetic acid, benzoic acid, para-aminobenzoic acid, anthranilic acid, para-hydroxybenzoic acid, salicylic acid, para-aminosalicylic acid, embonic acid, methane-sulfonic acid, ethane-sulfonic acid, hydroxyethane-sulfonic acid, ethylene-sulfonic acid; halogenbenzene-sulfonic acid, toluene-sulfonic acid, naphthalene-sulfonic acid and sulfanilic acid; methionine tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process in which an intermediate product obtainable at any stage of the process is used as starting material and any remaining steps are carried out, or the process is discontinued at any stage thereof, or in which the starting materials may be used in the form of their salts, and/or are formed under the reaction conditions.

For example the enolethers and enolesters of the carboxylic acid amides can be formed under the reaction conditions. For example, the acid amide may be reacted in the presence of an acid halide such as p-toluenesulfonylchloride or phosgene.

It is advantageous to use those starting materials in the reactions of the invention that lead to the formation of those compounds indicated above as being worthy of special mention.

The starting materials are known or can be obtained by methods in themselves known.

The new compounds can be used in the free form or in the form of their salts, for example, for the manufacture of pharmaceutical preparations containing the said compounds in admixture with organic or inorganic, solid or liquid pharmaceutical excipients suitable for enteral, for example, oral, parenteral or local administration. Suitable excipients are substances that do not react with the new compounds for example, water, gelatine, lactose, starch, magnesium stearate talcum, vegetable oils, benzyl alcohols, gums, polyalkylene glycols, white petroleum jelly, cholesterol and other known medicinal excipients. The pharmaceutical preparations may be, for example, tablets, dragees, capsules, creams or ointments, or in liquid form as solutions, suspensions or emulsions. The creams and ointments may contain, for example, 0.1 to 2% of the active principle, preferably 0.25 to 1%. The preparations may be sterilized and/or contain assistants such as preserving, stabilizing, wetting or emulsifying agents, salts for regulating the osmotic pressure or buffers. They may further contain other therapeutically valuable substances. The compound may also be used in the usual manner as a disinfectant, for example, together with the usual carrier substances.

The following examples illustrate the invention.

EXAMPLE 1

6.0 grams of 3-(5-nitrofurfurylidene-methyl)-6-aminopyridazine, 6.0 grams of dimethylformamide-diethylacetal and 10.0 ml. of dimethylformamide are heated for 2 hours at 100° C. The precipitate that forms when the reaction mixture cools is recrystallized from a mixture of dimethylformamide and alcohol. The product obtained is N-[3 - (5-nitrofurfurylidene-methyl) - 6-pyridazinyl]-N':N' dimethylformamidine of the formula

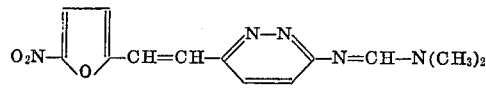

in the form of yellow crystals melting at 212 to 215° C.

The base is dissolved in hot dimethylformamide. The hydrochloride melting at 246° C. is precipitated by the addition of hydrochloric acid in alcohol.

EXAMPLE 2

4.0 grams of 2-(5-nitrofurfurylidene-methyl)-6-aminoquinoline, 5.0 grams of dimethylformamide-diethylacetal and 4.0 ml. of dimethylformamide are heated for 2 hours at 100° C. The precipitate that forms when the reaction mixture cools is recrystallized from a mixture of dimethylformamide and methanol. The product obtained is N-[2-(5-nitrofurfurylidene-methyl) - 6-quinolyl]-N':N'-dimethylformamidine of the formula

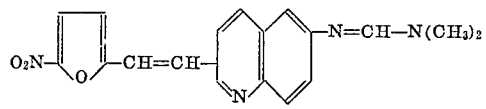

in the form of crystals melting at 190° C.

The methanesulfonate is obtained by dissolving the base in dimethylformamide and adding an equivalent of methane-sulfonic acid. The methane sulfonate melting at 265° C. is precipitated by the addition of alcohol.

The 2-(5-nitrofurfurylidene-methyl)-6-aminoquinoline used as starting material may be prepared as follows:

A solution of 7.4 grams of 2-methyl - 6-aminoquinoline and 6 grams of 5-nitrofurfural in 75 ml. of acetic anhydride is heated for 2 hours at 130° C. The precipitate is isolated by suction filtration and recrystallized from a mixture of dimethylformamide and alcohol. 2-(5-nitrofurfurylidene-methyl) - 6-acetamidoquinoline is obtained in the form of crystals melting at 284 to 286° C.

12 grams of 2-(5-nitrofurfurylidene-methyl) - 6-acetamidoquinoline are boiled for 3 hours with 120 ml. of 2 N-hydrochloric acid in 120 ml. of methanol. The precipitate is isolated by filtration, extracted at the boil with 50 ml. of dimethylformamide, and the sparingly soluble 2-(5-nitrofurfurylidene-methyl) - 6-aminoquninoline hydrochloride is isolated by suction filtration. The compound melts at a temperature above 300° C.

The free base melts at 197 to 200° C.

EXAMPLE 3

In an manner analogous to that described in Examples 1 and 2 there may be prepared from the corresponding amines and imide chlorides, amide chlorides or acetals the following amidines:

N-[5-(5-nitrofurfurylidenemethyl)-1,3,4-oxadiazolyl-
  (2)]-N'-phenyl-N'-methyl-formamidine,
N-[5-(5-nitrofurfurylidenemethyl)-1,3,4-thiadiazolyl-
  (2)]-N'-allyl-N'-methyl-formamidine,
N-[4-(5-nitrofurfurylidenemethyl)-5-chloro-2-pyrimidyl]-
  N'-cyclohexyl-N'-methyl-formamidine,
N-[6-(5-nitrofurfurylidenemethyl)-3-as-triazinyl]-N',N'-
  dimethylacetamidine,
N-[3-(5-nitrofurfurylidenemethyl)-6-as-triazinyl]-
  N'-ethyl-N'-methyl-formamidine,
N-[2-(5-nitrofurfurylidenemethyl)-7-methyl-4-quinolyl]-
  N',N'-pentamethylene-benzamidine, N-[4-(5-nitrofurfurylidenemethyl)-8-methoxy-2-quinolyl]-
N',N'-tetramethylene-para-methylbenzamidine,
N-[2-(5-nitrofurfurylidenemethyl)-8-trifluoromethyl-5-
quinolyl]-N',N'-dimethyl-para-chlorobenzamidine,
N-[2-[α-(5-nitrofurfurylidene)-ethyl]-8-quinolyl]-N'-
cyclopentylmethyl-N'-methyl-formamidine,
N-[2-(5-nitrofurfurylidenemethyl)-5-pyridyl]-N'-(meta-
methoxyphenyl)-N'-methyl-formamidine,
N-[2-(5-nitrofurfurylidenemethyl)-3-chloro-6-pyridyl]-
N',N-(3-oxapentamethylene)-formamidine,
N-[4-(5-nitrofurfurylidenemethyl)-6-methyl-2-pyridyl]-
N'-(ortho-tolylmethyl)-phenylacetamidine,
N-[4-(5-nitrofurfurylidenemethyl)-3-pyridazinyl]-N'-
methyl-N'-ethyl-acetamidine,
N-[4-(5-nitrofurfurylidenemethyl)-6-pyridazinyl]-N'-
meta-tolyl-N'-methyl-formamidine,
N-[2-(5-nitrofurfurylidenemethyl)-4-pyrimidyl]N',N'-
(3-methyl-3-azapentamethylene)-formamidine,
N-[2-(5-nitrofurfurylidenemethyl)-6-pyrazinyl]-N'-
(metachlorobenzyl)-N'-methyl-formamidine,
N-[2-(5-nitrofurfurylidenemethyl)-1-ethyl-4-imidazolyl]-
N',N'-dimethyl-para-(trifluoromethyl)-phenylacetami-
dine,
N-[3-(5-nitrofurylidenemethyl)-1-methyl-5-pyrazolyl]-
N'-(ortho-methoxybenzyl)-N'-methyl-formamidine,
N-[2-(5-nitrofurfurylidenemethyl)-1-methyl-7-methoxy-
5-benzimidazolyl]-N'-(para-trifloromethyl-phenyl)-N'-
methyl-para-methoxyphenylacetamidine,
N-[2-(5-nitrofurfurylidenemethyl)-4-oxazolyl]-N'-
methyl-N'-ortho-fluorophenyl-formamidine,
N-[2-(5-nitrofurfurylidenemethyl)-4-thiazolyl]-N'-
methyl-N'-ethyl-para-fluorophenylacetamidine,
N-[2-(5-nitrofurfurylidenemethyl)-6-methyl-5-
benzoxazolyl]-N'-cyclopentyl-N'-methyl-formamidine,
N-[2-(5-nitrofurylidenemethyl)-6-chloro-5-benzthia-
zolyl]-N',N'-dimethylpropionamidine,
N-[2-(5-nitrofurfurylidenemethyl)-4-s-triazinyl]-N'-
(para-bromophenyl)-N'-methyl-formamidine and
N-[3-(5-nitrofurfurylidenemethyl)-1,2,4-triazolyl(5)]-
N',N'-dimethyl-ortho-methylphenylacetamidine.

EXAMPLE 4

A cream having the following composition is prepared
in the customary manner:

| | Percent |
|---|---|
| N-[3-(5-nitrofurfurylidene-methyl)-6-pyridazinyl]-N':N'-dimethylformamidine | 1 |
| Paraffin oil | 2 |
| White petroleum jelly | 97 |

What is claimed is:
1. A member selected from the group consisting of
compounds of the formula

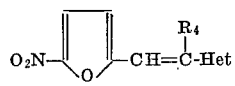

in which Het represents a heterocyclic radical Z' which is
C-substituted by the group of the formula

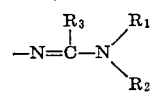

Z' being a member selected from the group consisting of
2-quinolyl, 4-quinolyl, 2-pyridyl, 4-pyridyl, 3-pyridazinyl,
4-pyridazinyl, 2-pyrimidinyl, 4-pyrimidinyl, 2-pyrazinyl,
2-oxazolyl, 2-thiazolyl, 2-benzoxazolyl, 2-benzthiazolyl,
6-as-triazinyl, 3-as-triazinyl, 2-s-triazinyl and said radicals
C-substituted by a member selected from the group con-
sisting of lower alkyl, lower alkoxy, halogen and trifluoro-
methyl; and 2-imidazolyl, 3-pyrazolyl, 2-benzimidazolyl,
the latter three radicals carrying at one ring nitrogen atom
a member selected from the group consisting of hydrogen
and lower alkyl, and said radicals C-substituted by a mem-
ber selected from the group consisting of lower alkyl,
lower alkoxy, halogen and trifluoromethyl; and 1,3,4-
oxadiazolyl, 1,3,4-thiadiazolyl and 1,2,4-triazolyl; $R_1$ and
$R_2$ each stands for a member selected from the group
consisting of hydrogen, lower alkyl, lower alkenyl, lower
cycloalkyl, lower cycloalkenyl, lower cycloalkyl-lower
alkyl, lower cycloalkenyl-lower alkyl, phenyl, lower alkyl-
phenyl, lower alkoxyphenyl, halogenophenyl, trifluoro-
methylphenyl, phenyl-lower alkyl, lower alkyl-phenyl-
lower alkyl, lower alkoxy-phenyl-lower alkyl, halogeno-
phenyl-lower alkyl and trifluoromethyl-phenyl-lower alkyl
and when taken together with the nitrogen atom, lower
alkyleneimino, morpholino, thiomorpholino and N-
methyl-piperazino, $R_3$ stands for a member selected from
the group consisting of hydrogen, lower alkyl, phenyl,
lower alkylphenyl, lower alkoxyphenyl, halogenophenyl,
trifluoromethylphenyl, phenyl-lower alkyl, lower alkyl-
phenyl-lower alkyl, lower alkoxy-phenyl-lower alkyl,
halogenophenyl-lower alkyl and trifluoromethylphenyl-
lower alkyl, and $R_4$ for a member selected from the group
consisting of hydrogen and lower alkyl, and acid addition
salts thereof.
2. A member selected from the group consisting of
compounds of the formula

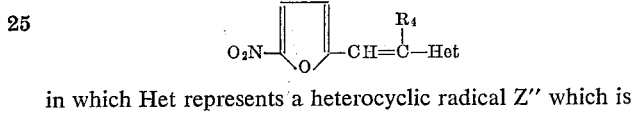

in which Het represents a heterocyclic radical Z" which is
C-substituted by the group of the formula

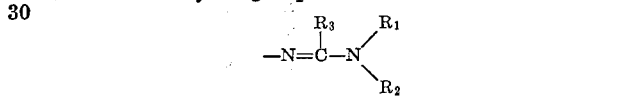

Z" being a member selected from the group consisting of
2-imidazolyl, 3-pyrazolyl, 2-benzimidazolyl, said three
radicals carrying at one ring nitrogen atom a member
selected from the group consisting of hydrogen and lower
alkyl; and 2-quinolyl, 4-quinolyl, 2-pyridyl, 4-pyridyl, 3-
pyridazinyl, 4-pyridazinyl, 2-pyrimidinyl, 4-pyrimidinyl, 2-
pyrazinyl, 2-oxazolyl, 2-thiazolyl, 2-benzoxazolyl, 2-
benzthiazolyl, 6-as-triazinyl, 3-as-triazinyl, 2-s-triazinyl,
1,3,4-oxadiazolyl, 1,3,4-thiadiazolyl and 1,2,4-triazolyl, $R_1$
and $R_2$ each stands for a member selected from the group
consisting of hydrogen, lower alkyl, phenyl, lower alkyl-
phenyl, lower alkoxyphenyl, halogenophenyl and trifluoro-
methylphenyl and, when taken together with the nitrogen
atom for pyrrolidino, piperidino, piperazino and mor-
pholino, $R_3$ stands for a member selected from the group
consisting of hydrogen, lower alkyl, phenyl, lower alkyl-
phenyl, lower alkoxyphenyl, halogenophenyl and tri-
fluoromethylphenyl and $R_4$ for a member selected from the
group consisting of hydrogen and lower alkyl, and acid
addition salts thereof.
3. A member selected from the group consisting of
compounds of the formula

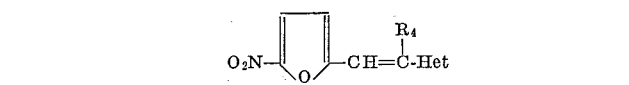

in which Het stands for a heterocyclic radical Z which is
C-substituted by the group of the formula

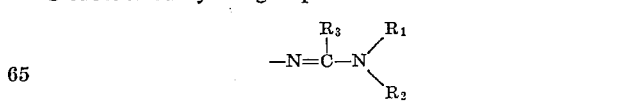

Z being a member selected from the group consisting of
2-quinolyl, 4-quinolyl, 2-pyridyl, 4-pyridyl and said radi-
cals C-substituted by a member selected from the group
consisting of lower alkyl, lower alkoxy, halogen and tri-
fluoromethyl, $R_1$ and $R_2$ each stands for a member se-
lected from the group consisting of hydrogen, lower alkyl,
phenyl, lower alkylphenyl, lower alkoxyphenyl, halogeno-
phenyl and trifluoromethylphenyl and, when taken to-
gether with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof.

4. A member selected from the group consisting of compounds of the formula

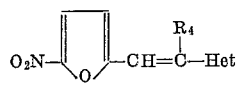

in which Het stands for a heterocyclic radical Z which is C-substituted by the group of the formula

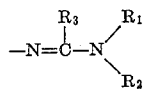

Z being a member selected from the group consisting of 2-quinolyl, 4-quinolyl, 2-pyridyl, and 4-pyridyl, $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof.

5. A member selected from the group consisting of compounds of the formula

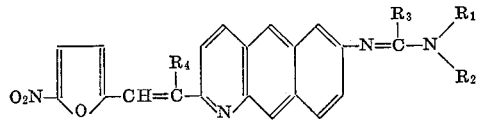

in which $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof.

6. A compound of the formula

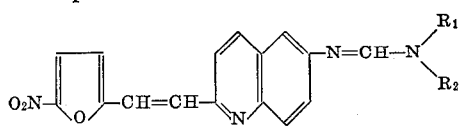

in which $R_1$ and $R_2$ each stands for lower alkyl.

7. An acid addition salt of a compound claimed in claim 6.

8. N - [2 - (5 - nitrofurfurylidenemethyl)-6-quinolyl]-N':N'-dimethylformamidine.

9. An acid addition salt of the compound claimed in claim 8.

10. A member selected from the group consisting of compounds of the formula

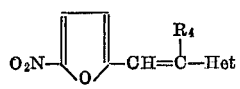

in which Het stands for a heterocyclic radical Z which is C-substituted by the group of the formula

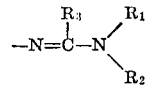

Z being a member selected from the group consisting of 3-pyridazinyl and 4-pyridazinyl and said radicals substituted by a member selected from the group consisting of halogen and trifluoromethyl, $R_1$ and $R_2$ each stands for a member selected from the group consisting of hydrogen, lower alkyl, phenyl, lower alkylphenyl, lower alkoxyphenyl, halogenophenyl and trifluoromethylphenyl and when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof.

11. A member selected from the group consisting of compounds of the formula

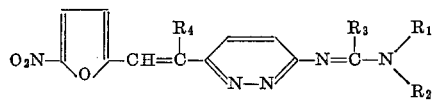

in which $R_1$ and $R_2$ each stands for a member selected from the group consisting of hydrogen, lower alkyl, phenyl, lower alkylphenyl, lower alkoxyphenyl, halogenophenyl and trifluoromethylphenyl and, when taken together with the nitrogen atom for pyrrolidino, piperidino, piperazino and morpholino, $R_3$ stands for a member selected from the group consisting of hydrogen, lower alkyl, phenyl, lower alkylphenyl, lower alkoxyphenyl, halogenophenyl and trifluoromethylphenyl and $R_4$ for a member selected from the group consisting of hydrogen and lower alkyl, and acid addition salts thereof.

12. A compound of the formula

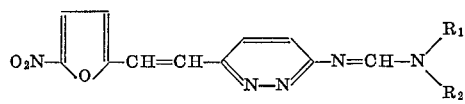

in which $R_1$ and $R_2$ each stands for lower alkyl.

13. An acid addition salt of a compound as claimed in claim 12.

14. N - [3 - (5 - nitrofurfurylidenemethyl) - 6 - pyridazinyl] - N':N'-dimethylformamidine.

15. An acid addition salt of the compound as claimed in claim 14.

References Cited

UNITED STATES PATENTS

| | | | |
|---|---|---|---|
| 3,073,851 | 1/1963 | Steiger | 260—396.6 |
| 3,182,053 | 5/1965 | Steiger | 260—156 |
| 3,318,904 | 5/1967 | Schmidt et al. | 260—306.8 |

OTHER REFERENCES

Miura et al., Yakugaku Zasshi, vol. 83, pages 771 to 777 (1963).

Derwent Japanese Patents Reports, vol. 4, group 3, page 3 (abstract of Japanese Patent 4,637, granted Mar. 12, 1965), March 1965.

JOHN D. RANDOLPH, Primary Examiner

U.S. Cl. X.R.

424—250

CASE 5560/E

PO-1050
(5/69)

UNITED STATES PATENT OFFICE
CERTIFICATE OF CORRECTION

Patent No. 3,488,728　　　　　　Dated January 6, 1970

Inventor(s) Max Wilhelm et al

It is certified that error appears in the above-identified patent and that said Letters Patent are hereby corrected as shown below:

Column 7, line 10, "N',N" should be --- N',N' ---.

Column 9, claim 5, change the condensed ring system portion of the formula to read:

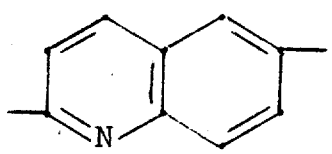

Signed and sealed this 10th day of August 1971.

(SEAL)
Attest:

EDWARD M.FLETCHER,JR.　　　　　　　　WILLIAM E. SCHUYLER, JR.
Attesting Officer　　　　　　　　　　Commissioner of Patents